(12) United States Patent
Becker et al.

(10) Patent No.: US 10,317,313 B2
(45) Date of Patent: Jun. 11, 2019

(54) LARGE DISPLACEMENT, TUNED MARINE VESSEL DECK SIMULATING FIXTURE FOR SHOCK ISOLATED EQUIPMENT

(71) Applicant: ASCENDANT ENGINEERING SOLUTIONS, Austin, TX (US)

(72) Inventors: Keith Eric Becker, Georgetown, TX (US); George Gregory Mooty, Austin, TX (US)

(73) Assignee: Ascendant Engineering Solutions, Austin, TX (US)

( * ) Notice: Subject to any disclaimer, the term of this patent is extended or adjusted under 35 U.S.C. 154(b) by 230 days.

(21) Appl. No.: 15/346,108

(22) Filed: Nov. 8, 2016

(65) Prior Publication Data

US 2017/0138817 A1 May 18, 2017

Related U.S. Application Data

(60) Provisional application No. 62/257,134, filed on Nov. 18, 2015.

(51) Int. Cl.
*G01M 7/08* (2006.01)
*G01M 10/00* (2006.01)

(52) U.S. Cl.
CPC .............. *G01M 7/08* (2013.01); *G01M 10/00* (2013.01)

(58) Field of Classification Search
CPC ................................. G01M 7/08; G01M 10/00
See application file for complete search history.

(56) References Cited

U.S. PATENT DOCUMENTS

| 5,538,357 A * | 7/1996 | Boswell, Sr. ........... E01C 1/002 104/38 |
| 7,540,195 B2 * | 6/2009 | Nelsen ................... G01M 7/022 73/666 |
| 9,880,066 B2 * | 1/2018 | Larsen ...................... G01L 5/16 |

\* cited by examiner

*Primary Examiner* — Paul M. West
(74) *Attorney, Agent, or Firm* — David O. Simmons; IVC Patent Agency

(57) ABSTRACT

Embodiments of the present invention are directed to an apparatus, system and associated method of operation that allows medium weight Class II equipment to be shock tested using a Medium Weight Shock Machine (MWSM) in a manner that adequately simulates the required shock response exhibited when subjected to underwater explosion (UNDEX), Heavyweight testing utilizing a FSP. Advantageously, such an apparatus, system and associated method allows for testing of Class II medium weight (e.g., about 500-4500 lbs.) equipment (e.g., submarine and surface vessel equipment) utilizing an MWSM instead of Heavyweight testing utilizing a Floating Shock Platform (FSP). Testing of Class II medium weight equipment in this manner significantly reduces cost of testing such equipment and increases safety associated with testing such equipment.

18 Claims, 7 Drawing Sheets

LARGE DISPLACEMENT, TUNED MARINE VESSEL DECK SIMULATING FIXTURE FOR SHOCK ISOLATED EQUIPMENT

CROSS-REFERENCE TO RELATED APPLICATIONS

This non-provisional patent application claims priority from U.S. Provisional Patent Application having Ser. No. 62/257,134, filed 18 Nov. 2015, entitled "LARGE DISPLACEMENT, TUNED MARINE VESSEL DECK SIMULATING FIXTURE FOR SHOCK ISOLATED EQUIPMENT", having a common applicant herewith and being incorporated herein in its entirety by reference.

GOVERNMENT LICENSE RIGHTS

This invention was made with government support under Phase II Small Business Innovation Research (SBIR) contract no. N00024-15-C-4008 awarded by Naval Sea Systems Command (NAVSEA). The Government has certain rights in this invention.

FIELD OF THE DISCLOSURE

The disclosures made herein relate generally to test equipment and procedures for shock sensitive equipment and, more particularly, to a large displacement, tuned marine vessel deck simulating fixture for shock-isolated equipment.

BACKGROUND

Submarines and other types of military ships are examples of marine vessels that are subject to shock impacts such as, for example, those generated by energy from nearby explosions. Shock testing and qualification is essential to the certification process of critical equipment installed in such vessels. To ensure a level of resistance to damage resulting from shock-induced loadings, shock qualification testing must adequately simulate environment and input forces resulting in shock impacts exerted on the ship.

Testing requirements for equipment installed in such vessels are determined by their orientation, location and method of attachment to the ships structure. Class I equipment must meet specific shock test requirements when installed, without the use of resilient mounting hardware between the device and the ship's structure. Class II equipment is required to meet MIL-S-901 standards for shock resistance, but can do so with the use of resilient mounting parts when installed in its proper shipboard position when applicable.

Currently, shock qualification testing of Class II medium weight (i.e., 500-4500 lb) equipment typical to military seaworthy vessels requires underwater explosion ("UNDEX") testing utilizing a Floating Shock Platform (FSP), which simulates a marine vessel such as a submarine or other type of ship. This corresponds to the Heavyweight test category of MIL-S-901 ("Heavyweight test"). A Unit Under Test (UUT), which is a particular piece or pieces of equipment or simulated representation thereof, is mounted on the FSP in the same or comparable manner as it would be on an actual vessel on which it would be installed. The Heavyweight test subjects the FSP to a shock impact by a nearby underwater explosive charge. The FSP deck frequency and the underwater explosive charge size and depth are jointly configured to exhibit the desired frequency response and magnitude of the shock impact imparted on the FSP by the explosive charge.

Conducting a Heavyweight test utilizing a FSP is substantially more expensive than associated test of equipment on a Medium Weight Shock Machine (MWSM). The cost savings from the MWSM result from it being performed in a readily accessible and controlled environment on a laboratory test apparatus. The logistics and safety issues associated with Heavyweight testing are significantly increased compared to MWSM testing. It is not currently permissible to test Class II medium weight equipment using a MWSM because there is no existing MWSM fixture/method that adequately simulates the required dynamic environment when testing on the MWSM. As a result, medium weight Class II equipment has to be shock tested on FSPs that is substantially more expensive and schedule intensive than testing on a MWSM. Testing on a MWSM is on average at least five times less expensive than a Heavyweight test using a FSP.

Although much of the medium weight Class II equipment is light enough to be mounted in a MWSM, a technology, technique, or fixture does not currently exist that sufficiently replicates the environment seen during a FSP shock event. Therefore, an apparatus and associated method of operation that allows medium weight Class II equipment to be tested on a MWSM in a manner that adequately simulates the required dynamic response exhibited when subjected to Heavyweight test utilizing a FSP would be advantageous, desirable and useful.

SUMMARY OF THE DISCLOSURE

Embodiments of the present invention are directed to an apparatus, system and associated method of operation that allows medium weight Class II equipment to be shock tested using a Medium Weight Shock Machine (MWSM) in a manner that adequately simulates the required shock response exhibited when subjected to underwater explosion (UNDEX), Heavyweight testing utilizing a FSP. Advantageously, such an apparatus, system and associated method allows for testing of Class II medium weight (e.g., about 500-4500 lbs.) equipment (e.g., submarine and surface vessel equipment) using a MWSM test instead of Heavyweight testing utilizing a Floating Shock Platform (FSP). Testing of Class II medium weight equipment in this manner significantly reduces cost of testing such equipment and increases safety associated with testing such equipment.

Embodiments of the present invention include both a Large Displacement Mechanism (LDM) and a low frequency Deck-Simulating Fixture (DSF) for use with the MWSM. This LDM and DSF system is referred to herein as the Large Displacement, Tuned Deck Simulating Fixture for Medium Weight Shock Isolated Equipment (LTMS). The LTMS is essentially a simple mechanical device that uses the momentum of an impact hammer of the MWSM to generate similar motions as produced on the FSP. In preferred embodiments, the LTMS is configured to accommodate a UUT (e.g., up to or beyond 2900 lbs.) mounted to the 5-foot square anvil mounting plate interface of the MWSM and can allow the large displacement (e.g., greater than 3" MWSM anvil travel) required to provide potential displacement damage producing mechanisms for a UUT. In combination, the MSWM and LTMS provide a low-cost alternative to Heavyweight testing of Class II medium weight equipment utilizing a FSP, reproducing the shock response and movement of Class II medium weight equipment when tested on a FSP in a Heavyweight test. To this end, the LTMS integrates with MWSM, simulates FSP deck responses, and replicates low frequency shock events.

In preferred embodiments, the LTMS incorporates a Large Displacement Mechanism (LDM) combined with a Deck Simulating Fixture (DSF). The LDM allows for the large displacements (e.g., greater than 3" MWSM anvil travel) that produce damage to a resiliently-mounted UUT. In preferred embodiments, the LTMS is tuned for deck frequencies of 8, 14 and 25 Hz. Preferred embodiments, the LTMS incorporates a Large Displacement Mechanism (LDM) combined with a Deck Simulating Fixture (DSF).

In one embodiment of the present invention, an apparatus adapted for enabling medium weight Class II equipment to be shock tested using a Medium Weight Shock Machine (MWSM) to simulate underwater explosion testing utilizing a Floating Shock Platform (FSP). The apparatus comprises a large displacement mechanism (LDM) and a deck simulation fixture (DSF). The LDM includes a platform and a plurality of vertical movement control structures each coupled at a first end portion thereof to the platform. Each one of the vertical movement control structures allows the platform to translate vertically with respect to a second end portion thereof. The DSF includes a unit under test (UUT) mounting structure and a platform mounting structure. The platform mounting structure is coupled to the UUT mounting structure and to the platform.

In another embodiment, a shock testing system comprises an anvil, a large displacement mechanism (LDM), and a deck simulation fixture (DSF). The anvil includes a unit under test (UUT) support structure and a hammer impingement structure connected to the UUT mounting structure for transmitting a shock loading imparted upon the hammer impingement structure to the UUT mounting structure. The LDM includes a platform and a plurality of hinge assemblies. Each one of the hinge assemblies includes two hinge bodies each having a first end portion and a second end portion. The first end portion of each one of the hinge bodies are pivotably attached to each other. A second end portion of a first one of the hinge bodies is pivotably attached to the platform and a second end portion of a second one of the hinge bodies is pivotably attached to the UUT support structure. The DSF includes a UUT mounting structure and a platform mounting structure. The platform mounting structure is coupled to the UUT mounting structure and to the platform.

In another embodiment, a method is provided for simulating underwater explosion testing utilizing a Floating Shock Platform (FSP). An operation is performed for coupling a large displacement mechanism (LDM) to an anvil of a Medium Weight Shock Machine (MW SM) through a plurality of vertical movement control structures of the LDM. The vertical movement control structures jointly allow a platform of the LDM to translate vertically with respect to the anvil and inhibit translation in other directions of travel. An operation is performed for mounting a unit under test (UUT) on a UUT mounting structure of a deck simulation fixture (DSF) that is coupled to the platform of the LDM, followed by imparting a shock load vertically on an impingement structure of the anvil. In response to imparting the shock load, the platform is allowed to undergo a first instance of travel from a fully collapsed position with respect to the anvil to a vertically extended position with respect to the anvil and from the vertically extended position back to the fully collapsed position. Following the first instance of travel, the platform is inhibited from undergoing a second instance of travel from the fully collapsed position with respect to the anvil after the platform returns to the fully collapsed position during the first instance of travel.

These and other objects, embodiments, advantages and/or distinctions of the present invention will become readily apparent upon further review of the following specification, associated drawings and appended claims.

DETAILED DESCRIPTION

Apparatuses, systems and associated methods of operation configured in accordance with embodiments of the present invention allows medium weight Class II equipment to be shock tested using a Medium Weight Shock Machine (MWSM) in a manner that adequately simulates the required shock response exhibited when subjected to an underwater explosion (UNDEX) Heavyweight test utilizing a Floating Shock Platform (FSP). The Heavyweight test, which is also commonly referred to as the Barge (i.e., FSP) Test, requires the Unit Under Test (UUT) to be mounted on the tunable deck simulating fixture (DSF) of the FSP. For a standard Heavyweight test utilizing the FSP, 60 pounds of HBX-1 explosive (i.e., the explosive charge) is placed 24 feet under water at various distances from the barge and detonated. For example, a first explosion is conducted on the fore-and-aft axis 40 feet from the barge. Subsequent additional explosions can be conducted athwart ship to the FSP at distances of 30, 25 and 20 feet from the near side of the FSP. In a large FSP test, for example, 300 pounds of HBX-1 explosive is placed 20 feet under water and the distances are 110 for shot fore-and-aft explosion and 50, 65 and 80 feet for athwart ship explosions.

Figure 1:
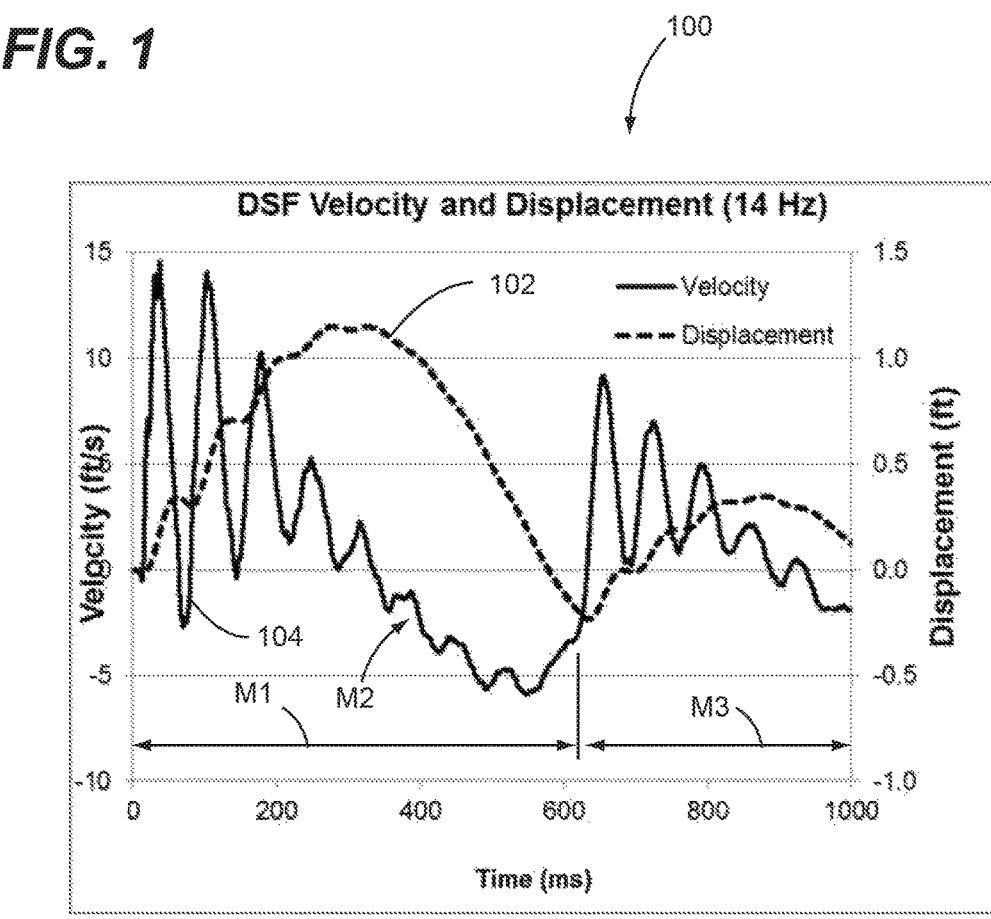
FIG. 1 is a graph showing a shock response time history for the DSF on a floating shock platform during a Heavyweight, underwater explosion test.
Figure 2:
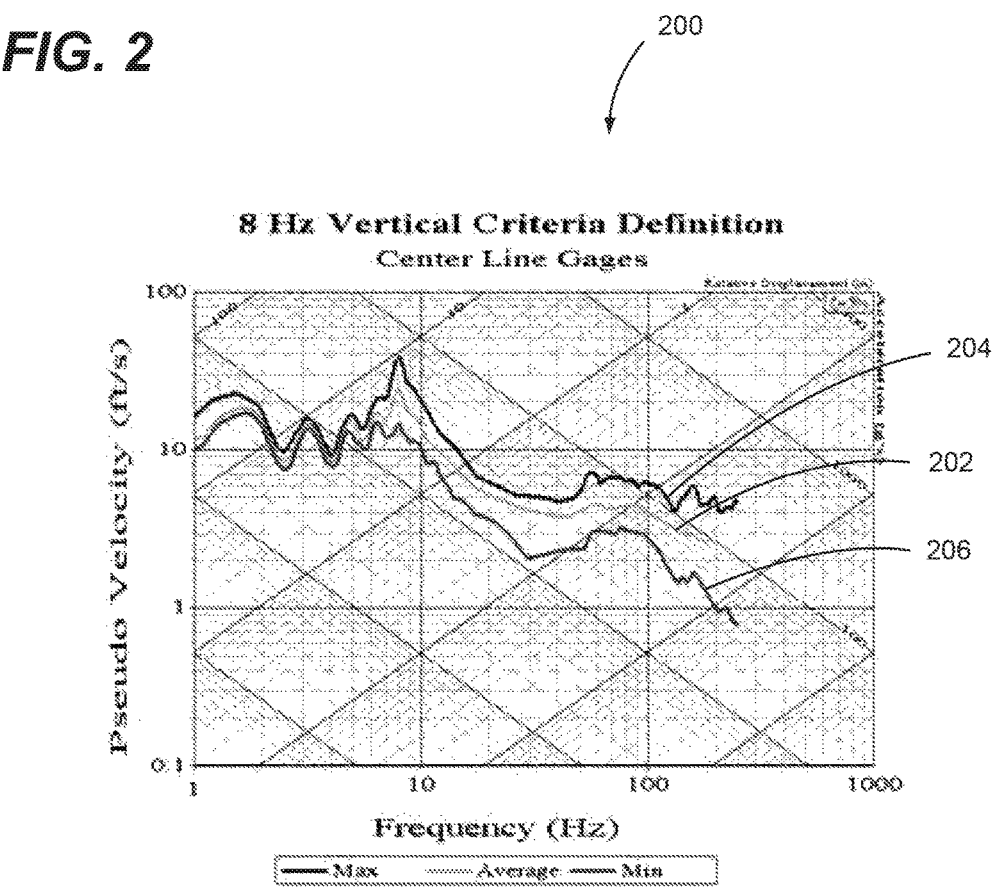
FIG. 2 is a graph showing a shock response spectrum (SRS) corresponding to the shock response time history of FIG. 1 for the floating shock platform during the underwater explosion test.

Accordingly, the Heavyweight test imparts a physical motion on the FSP where the FSP lifts fully or partially out of the water. The specific resulting physical motion is dependent upon the size of the explosive charge and the distance and orientation of the explosive charge with respect to the FSP. For a standard Heavyweight test utilizing a FSP, FIG. 1 shows a shock response time history graph 100 and FIG. 2 shows a shock response spectrum (SRS) graph 200. The shock response time history graph 100 includes a displacement curve 102 and a velocity curve 104 of the FSP resulting from explosion from the explosive charge. The shock response spectrum (SRS) graph 200 includes an average SRS curve 202 bounded by a maximum SRS curve 204 and a minimum SRS curve 206. The higher frequency oscillations are due to the Deck Simulating Fixture (DSF), which is custom set on the FSP for a particular deck frequency (e.g., 8, 14, 25 Hz). For the FSP, the DSF frequency is the only variable that's adjusted on the FSP, as the charge size and specific depth and distance from the barge are fixed by Heavyweight test procedure.

When the explosive charge for the Heavyweight test is ignited, the blast produces a large pulses in the water in which the FSP is floating, which literally lifts the FSP up and sideways (i.e., athwartship). As shown in FIG. 1, this initial motion M1 occurs during a period of about 600 milliseconds. The sideways motion occurs due to the explosive charge being off to the side of the FSP, as opposed to directly under the FSP. There is generally also a roll component to the FSP motion caused by this 'off-axis' effect.

The resiliently-mounted UUT (e.g., Class II equipment) is mounted on the FSP on a DSF (e.g., simply supported beams), whose cross-section and span are sized to produce a desired DSF frequency to simulate the condition on a vessel (e.g., surface ship or submarine). The blast of the explosive charge excites the DSF modes causing the decayed oscillating motion M2 seen in FIG. 1. There is a secondary "bubble" pulse that occurs after the initial blast of the explosive charge, thereby subjecting the FSP to a bubble pulse induced motion M3, as seen in FIG. 1. This secondary "bubble" pulse arises when a bubble of gas generated by the blast rises to the surface of the water in which the FSP is floating. However, the shock of this secondary bubble pulse is a relatively less severe than shock from the initial blast from the explosive charge.

As a skilled person will appreciate in view of the disclosures made herein, an apparatus configured in accordance with the present invention will produce a shock response time history graph and SRS graph for a UUT that is acceptably similar to those for a corresponding Heavyweight test of the UUT using a FSP. In this respect, for a given UUT, such an apparatus will simulate a Heavyweight test using a FSP.

Figure 3:
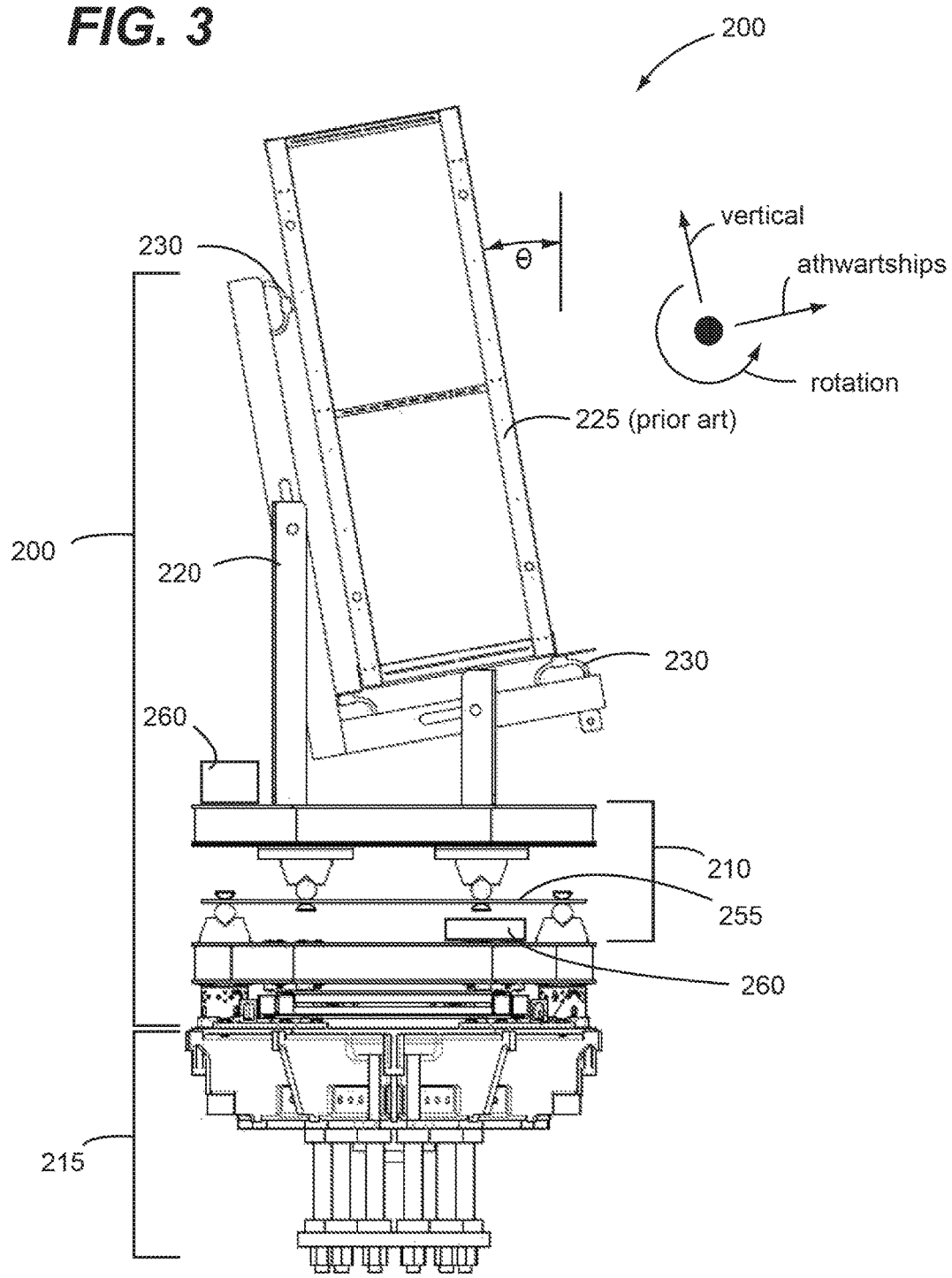
FIG. 3 is a illustrative view showing a Large Displacement, Tuned Deck Simulating Fixture for Medium Weight Shock Isolated Equipment (LTMS) configured in accordance with an embodiment of the present invention, including resiliently-mounted surrogate Class II equipment (19" electronics rack) and test fixture.
Figure 4:
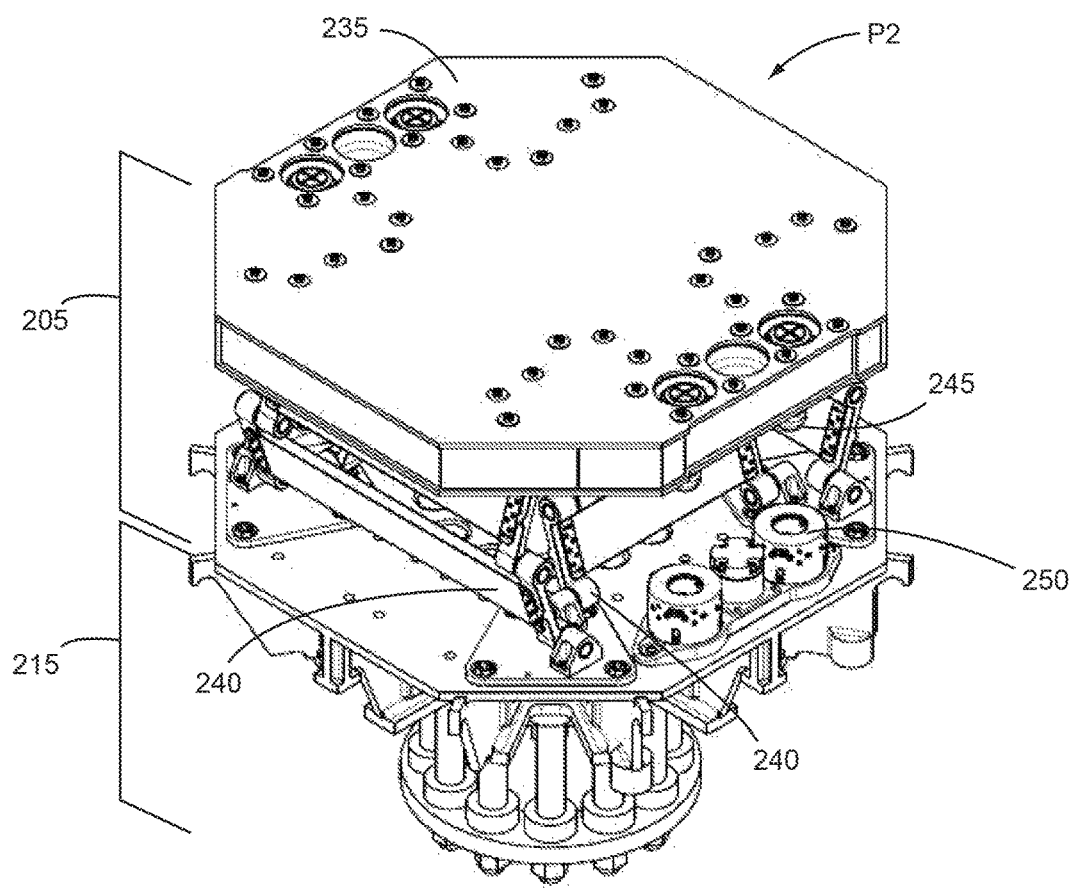
FIG. 4 is a perspective view of a Large Displacement Mechanism (LDM) configured in accordance with an embodiment of the present invention, which has a platform thereof in a vertically extended position with respect to an anvil of a Medium Weight Shock Machine (MWSM) to which the LDM is attached.
Figure 5:
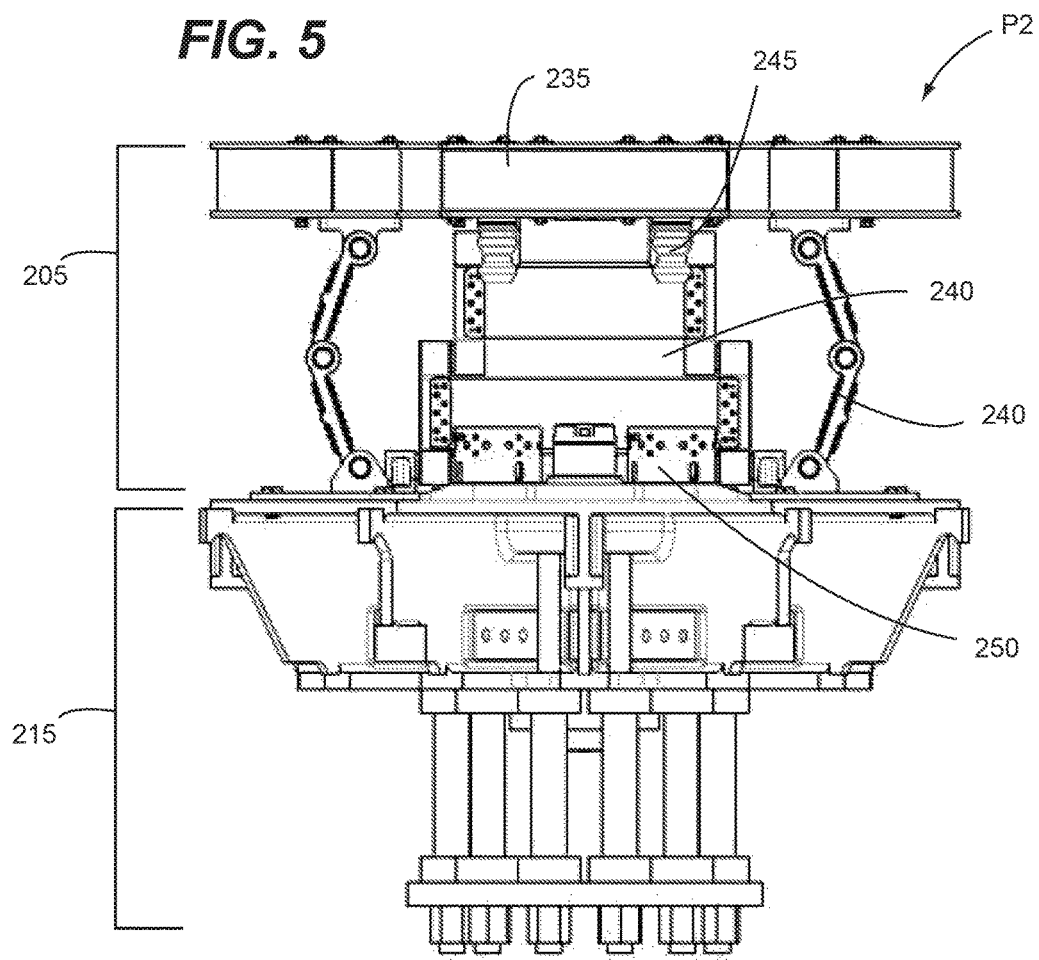
FIG. 5 is a side view of the LDM and anvil as shown in FIG. 4.
Figure 6:
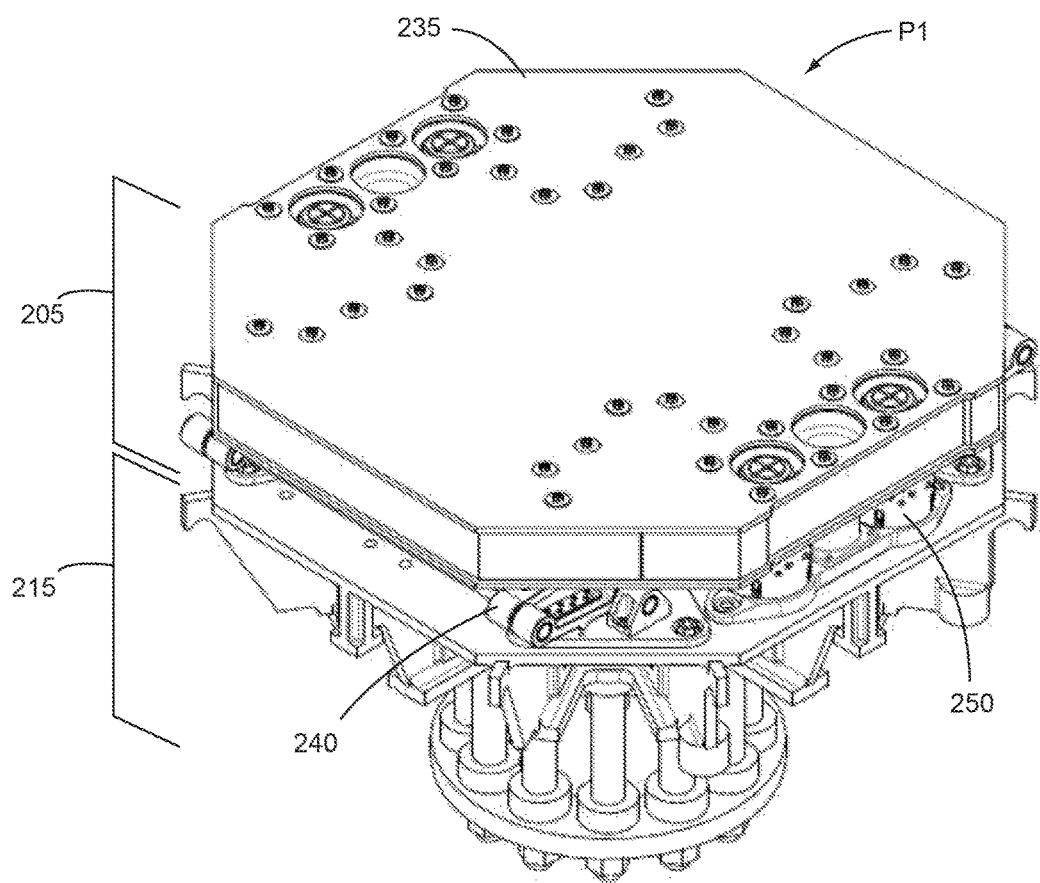
FIG. 6 is a perspective view of the LDM and anvil shown in FIG. 4, with the platform of the LDM in a collapsed position with respect to the anvil.
Figure 7:
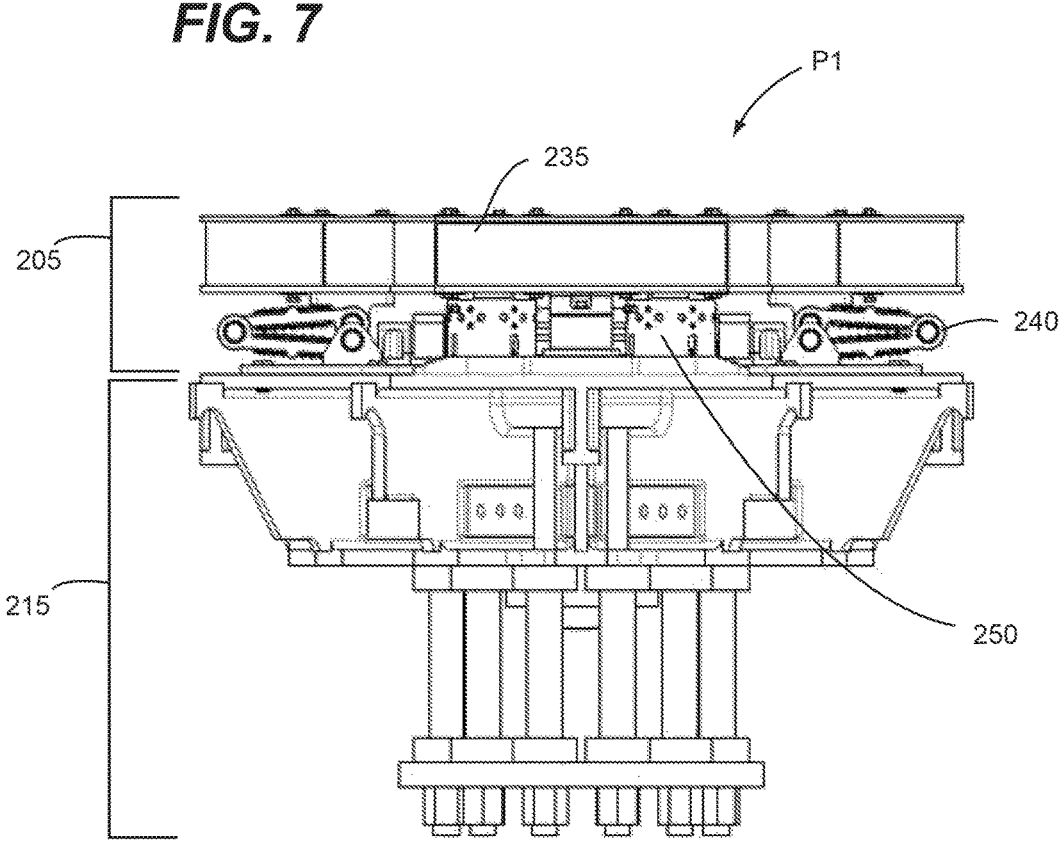
FIG. 7 is a side view of the LDM and anvil as shown in FIG. 6.

Referring now to FIGS. 3-7, a Large Displacement, Tuned Deck Simulating Fixture for Medium Weight Shock Isolated Equipment (LTMS) 200 configured in accordance with an embodiment of the present invention is shown. The LTMS 200 includes a Large Displacement Mechanism (LDM) 205 and a Deck Simulating Fixture (DSF) 210. A lower portion of the DSF 210 is attached to an upper portion of the LDM 205. A lower portion of the LDM 205 is attached to an anvil 215 of a Medium Weight Shock Machine (MWSM). A Unit Under Test (UUT) mount 220, shown in FIG. 3, is attached to an upper portion of the DSF 210 and a UUT 225 (i.e., prior art) is resiliently attached to the UUT mount 220 though a plurality of resilient mounting structures 230, also commonly known as shock isolators. The LTMS 200 is a simple mechanical device that is energized by momentum of a hammer on the MWSM anvil to generate the same motions as produced on the FSP by an explosive charge during a Heavyweight test.

Still referring to FIGS. 3-7, the LDM 205 is an embodiment of a structure configured in accordance with the present invention for reproducing the large physical motion of an FSP during a Heavyweight test. To this end, the LDM 205 includes a platform 235 that is coupled to the anvil 215 in a manner allowing the platform 235 to be vertically extended with respect to the anvil 215 between a collapsed position P1 (best shown in FIGS. 6 and 7) and a vertically extended position P2 (best shown in FIGS. 4 and 5) and to be fixedly secured in the collapsed position P1. The maximum magnitude of travel of the platform between the collapsed position P1 and the vertically extended position P2 is primary determined by a level of energy imparted on the anvil 215 by the hammer of the MWSM and the combined weight of everything mounted on the anvil.

In the depicted embodiment of the LDM 205 shown in FIGS. 3-6, the platform 235 is moveably coupled to the anvil 215 through a plurality of opposing sets of hinge assemblies 240 for allowing the LDM 205 to reproduce the large physical motion of the FSP during the Heavyweight test. The hinge assemblies 240 permit vertical displacement of the platform 235 with respect to the anvil 215. A skilled person will appreciate that the hinge assemblies 240 are one means for allowing vertical displacement of the platform 235 while constraining transverse displacement. In view of the disclosures made herein, a skilled person will appreciate other means for providing the functionality provided by the hinge assemblies 240 such as, for example, telescoping struts, guide rods, and the like.

As best shown in FIGS. 4-7, for fixedly securing the platform 235 in the collapsed position P1, each one of a plurality of pins 245 that are fixedly attached to the platform 235 can be selectively engaged with a respective latch mechanism 250 that is attached to the anvil 215. Alternatively, each one of a plurality of pins 245 can be fixedly attached to the anvil 215 and each one of the latch mechanisms 250 can be attached to the platform 235. In preferred embodiments, each one of the latch mechanisms 250 is a device (e.g., fully mechanical device) that can selectively allow a corresponding one of the pins 245 to be unrestrained to vertical movement by the respective one of the latch mechanism 250 as the platform 235 travels from the collapsed position P1 to the vertically extended position P2 and to inhibit vertical movement of the platform 235 with respect to the anvil 215 after the platform 235 returns from the vertically extended position P2 to the collapsed position P1.

In operation, when the hammer of the MWSM (i.e., MWSM hammer) strikes the anvil 215, energy resulting from momentum of the hammer is transferred to the LDM 205. At the time of such energy transfer, the platform 235 of the LDM 205 is decoupled from the anvil 215 for allowing the platform 235 of the LDM 205 to freely travel upward from the collapsed position P1 to the vertically extended position P2 without the mass of the anvil (i.e., the latch pins 245 are not fixedly coupled to the latches 250). Advantageously, such energy transfer to the LDM 205 and system components that the platform 235 of the LDM 205 carries (e.g., the DSF 210, the UUT mount 220, the UUT 225 and the rotation inducing weights 260) causes vertical displacement of the platform 235 of the LDM 205 and system components carried thereby that suitably simulates the magnitude of vertical displacement exhibited by a FSP during a Heavyweight test. After upward travel of the platform 235 is arrested by gravity (i.e., at the vertically extended position P2), the platform 235 of the LDM 205 returns downward until it reaches the fully retraced position P1, which causes each of the latch pins 245 to become fixedly engaged with a respective one of the latches 250 thereby locking the platform 235 to the anvil 215. Locking of the platform 235 on the anvil 215 (e.g., a mass of the anvil is approximately 4400 lbs.) simulates the extremely large mass of the FSP. In this respect, the LDM 205 enables a DSF velocity profile (e.g., shown in FIG. 1) that has an overall profile resembling that exhibited by the FSP during a Heavyweight test.

To reproduce the oscillating motion of the FSP during UNDEX testing (see FIGS. 1 and 2), the DSF 210 can be configured to selectively provide various desired resonant frequencies. The DSF 210 can be embodied as a simple plate structure that includes one or more mechanisms for tuning the DSF 210 to a desired resonant frequency. One example of a mechanisms for tuning the DSF 210 to a desired resonant frequency is through a plate spring 255 (FIG. 3) used for coupling the DSF 210 to the platform 235 of the LDM 205. Plate springs of different specifications (e.g., spring rate thereof) can be used as a method of tuning resonant frequency of the DSF 210 dependent upon the mass of everything attached above the plate spring and the particular frequency of the test. Another mechanisms for tuning the DSF 210 to a desired resonant frequency is the use of upper mounts that interface between the DSF 210 and the plate spring 255 (i.e., the mounts) being adjustable. For example, a distance between the mounts can be increased or decreased based on the mass supported on the plate spring. In a preferred embodiment, tuning the DSF 210 to a desired resonant frequency is achieved through use of different plate springs for each one of a different frequency (e.g., 8 Hz, 14 Hz or 25 Hz) and, for each one of the frequencies, the distance between the mounts being adjusted to increase or decrease the stiffness based on the weight of the UUT 225 weight being tested.

In addition to the vertical displacement of the UUT 225 provided by the LDM 205, simulating motion of the FSP during Heavyweight testing requires the UUT to exhibit athwartship motion (i.e., transverse to vertical and/or longitudinal axes) similar to that of the FSP resulting from off-axis positioning of the explosive charge in the Heavyweight test. To this end, as shown in FIG. 3, the UUT 225 is oriented at an angle ($\theta$) via the UUT mount 220 whereby displacement of the LDM 205 causes the UUT 225 to have vertical, athwartship and roll motion components. One approach for achieving the roll motions in the LTMS 200 includes having rotation-inducing weights 260 on the LDM 205 and the DSF 210 that induce roll motion, yet accommodate the requirement of the MWSM that the overall center-of gravity (CG) of the LTMS remain over the center of the anvil 215. An alternate approach for achieving the athwartship and roll motions includes having the center of stiffness of the plate spring 255 of the DSF 210 offset.

As can be seen, there are a limited number of variables to adjust vertical, athwartship and rotation motions. These variables are tilt of the UUT mount 220, mass of the rotation inducing weights 260, and/or offset (i.e., off-axis placement) of the rotation inducing weights 260. The limited number of adjustment variables is due to there being only a singular vertical axis of input on the anvil 215 by the hammer of the MWSM. Thus, by adjusting the tilt of the UUT mount 220, mass of the rotation inducing weights 260, offset of the rotation inducing weights 260, and stiffness of the plate spring 255 along with weight and height of the MWSM hammer, desired vertical, athwartship, roll, and shock responses can be achieved in a LTMS configured in accordance with preferred embodiments of the present invention.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of any claims appended hereto.

What is claimed is:

1. An apparatus adapted for enabling medium weight Class II equipment to be shock tested using a Medium Weight Shock Machine (MWSM) to simulate underwater explosion testing utilizing a Floating Shock Platform (FSP), the apparatus comprising:

a large displacement mechanism (LDM) including a platform and a plurality of vertical movement control structures each coupled at a first end portion thereof to the platform, wherein each one of the vertical movement control structures allows the platform to translate vertically with respect to a second end portion thereof, wherein each one of the vertical movement control structures includes a hinge assembly; wherein each one of the hinge assemblies includes two hinge bodies each having a first end portion and a second end portion and wherein the first end portion of each one of the hinge bodies are pivotably attached to each other; and a deck simulation fixture (DSF) including a unit under test (UUT) mounting structure and a platform mounting structure, wherein the platform mounting structure is coupled to the UUT mounting structure and to the platform, wherein the hinge bodies of a first set of the hinge assemblies are constrained to pivoting about a respective pivot axis that extends perpendicular to the vertical translation axis of the platform, wherein the hinge bodies of a second set of the hinge assemblies are constrained to pivoting about a respective pivot axis that extends perpendicular to the vertical translation axis of the platform and wherein the pivot axis of the first set of hinge assemblies extend perpendicular to the pivot axis of the second set of hinge assemblies.

2. The apparatus of claim 1 wherein:

a first one of the vertical movement control structures inhibits translation of the platform along a first translation axis;

a second one of the vertical movement control structures inhibits translation of the platform along a second translation axis;

the first translation axis extends perpendicular to the second translation axis; and the first and second translation axis extend substantially perpendicular to a vertical translation axis of the platform.

3. The apparatus of claim 1 wherein the platform mounting structure includes:

a plurality of platform mounts;

a plurality of UUT mounting structure mounts; and a spring plate connected to the platform mounts and to the UUT mounting structure mounts.

4. An apparatus adapted for enabling medium weight Class II equipment to be shock tested using a Medium Weight Shock Machine (MWSM) to simulate underwater explosion testing utilizing a Floating Shock Platform (FSP), the apparatus comprising:

a large displacement mechanism (LDM) including a platform and a plurality of vertical movement control structures each coupled at a first end portion thereof to the platform, wherein each one of the vertical movement control structures allows the platform to translate vertically with respect to a second end portion thereof, wherein each one of the vertical movement control structures includes a hinge assembly; wherein each one of the hinge assemblies includes two hinge bodies each having a first end portion and a second end portion and wherein the first end portion of each one of the hinge bodies are pivotably attached to each other;

a deck simulation fixture (DSF) including a unit under test (UUT) mounting structure and a platform mounting structure, wherein the platform mounting structure is coupled to the UUT mounting structure and to the platform a LDM mounting structure of a test machine; and at least one translation inhibiting device having a first portion thereof attached to the platform and a second portion thereof attached to the LDM mounting structure;

wherein the first and second portions of the at least one translation inhibiting device are adapted to engage each other for inhibiting the platform to translate vertically with respect to the LDM mounting structure;

wherein the at least one translation inhibiting device is adapted for allowing the platform to undergo a first instance of travel from a fully collapsed position to a vertically extended position with respect to the LDM mounting structure and from the vertically extended position back to the fully collapsed position and inhibiting the platform from undergoing a second instance of travel from the fully collapsed position after the platform returns to the fully collapsed position during the first instance of travel.

5. The apparatus of claim 4 wherein:

each one of the vertical movement control structures includes a hinge assembly;

each one of the hinge assemblies includes two hinge bodies each having a first end portion and a second end portion;

the first end portion of each one of the hinge bodies are pivotably attached to each other;

a second end portion of a first one of the hinge bodies is pivotably attached to the platform;

a second end portion of a second one of the hinge bodies is pivotably attached to the LDM mounting structure.

6. The apparatus of claim 5 wherein:

the hinge bodies of a first set of the hinge assemblies are constrained to pivoting about a respective pivot axis that extends perpendicular to the vertical translation axis of the platform;

the hinge bodies of a second set of the hinge assemblies are constrained to pivoting about a respective pivot axis that extends perpendicular to the vertical translation axis of the platform; and the pivot axis of the first set of hinge assemblies extend perpendicular to the pivot axis of the second set of hinge assemblies.

7. An apparatus adapted for enabling medium weight Class II equipment to be shock tested using a Medium Weight Shock Machine (MWSM) to simulate underwater explosion testing utilizing a Floating Shock Platform (FSP), the apparatus comprising:

a large displacement mechanism (LDM) including a platform and a plurality of vertical movement control structures each coupled at a first end portion thereof to the platform, wherein each one of the vertical movement control structures allows the platform to translate vertically with respect to a second end portion thereof, wherein each one of the vertical movement control structures includes a hinge assembly, wherein each one of the hinge assemblies includes two hinge bodies each having a first end portion and a second end portion, wherein the first end portion of each one of the hinge bodies are pivotably attached to each other, wherein a second end portion of a first one of the hinge bodies is pivotably attached to the platform and wherein a second end portion of a second one of the hinge bodies is pivotably attached to the UUT mounting structure; and a deck simulation fixture (DSF) including a unit under test (UUT) mounting structure and a platform mounting structure, wherein the platform mounting structure is coupled to the UUT mounting structure and to the platform, wherein the platform mounting structure is adapted for enabling a resonant frequency of the DSF to be selectively tuned to a plurality of different resonant frequencies.

8. The apparatus of claim 7 wherein:

a first one of the vertical movement control structures inhibits translation of the platform along a first translation axis;

a second one of the vertical movement control structures inhibits translation of the platform along a second translation axis;

the first translation axis extends perpendicular to the second translation axis; and the first and second translation axis extend perpendicular to a vertical translation axis of the platform.

9. An apparatus adapted for enabling medium weight Class II equipment to be shock tested using a Medium Weight Shock Machine (MWSM) to simulate underwater explosion testing utilizing a Floating Shock Platform (FSP), the apparatus comprising:

a large displacement mechanism (LDM) including a platform and a plurality of vertical movement control structures each coupled at a first end portion thereof to the platform, wherein each one of the vertical movement control structures allows the platform to translate vertically with respect to a second end portion thereof;

a deck simulation fixture (DSF) including a unit under test (UUT) mounting structure and a platform mounting structure, wherein the platform mounting structure is coupled to the UUT mounting structure and to the platform mounting structure and wherein the platform mounting structure is adapted for enabling a resonant frequency of the DSF to be selectively tuned to a plurality of different resonant frequencies;

a LDM mounting structure of a test machine; and at least one translation inhibiting device having a first portion thereof attached to the platform and a second portion thereof attached to the LDM mounting structure, wherein the first and second portions of the at least one translation inhibiting device are adapted to engage each other for inhibiting the platform to translate vertically with respect to the LDM mounting structure, wherein the at least one translation inhibiting device is adapted for allowing the platform to undergo a first instance of travel from a fully collapsed position with respect to the LDM mounting structure to a vertically extended position with respect to the LDM mounting structure and from the vertically extended position back to the fully collapsed position and inhibiting the platform from undergoing a second instance of travel from the fully collapsed position with respect to the LDM mounting structure after the platform returns to the fully collapsed position during the first instance of travel.

10. A shock testing system, comprising:
an anvil having a LDM mounting structure and a hammer impingement structure connected to the LDM mounting structure for transmitting a shock loading imparted upon the hammer impingement structure to the LDM mounting structure;
a large displacement mechanism (LDM) including a platform and a plurality of hinge assemblies, wherein each one of the hinge assemblies includes two hinge bodies each having a first end portion and a second end portion, wherein the first end portion of each one of the hinge bodies are pivotably attached to each other, wherein a second end portion of a first one of the hinge bodies is pivotably attached to the platform and a second end portion of a second one of the hinge bodies is pivotably attached to the LDM mounting structure; and
a deck simulation fixture (DSF) including a unit under test (UUT) mounting structure and a platform mounting structure, wherein the platform mounting structure is coupled to the UUT mounting structure and to the platform.

11. The shock testing system of claim 10 wherein:
the hinge bodies of a first set of the hinge assemblies are constrained to pivoting about a respective pivot axis that extends perpendicular to a vertical translation axis of the platform;
the hinge bodies of a second set of the hinge assemblies are constrained to pivoting about a respective pivot axis that extends perpendicular to the vertical translation axis of the platform; and
the pivot axis of the first set of hinge assemblies extend perpendicular to the pivot axis of the second set of hinge assemblies.

12. The shock testing system of claim 10, further comprising:
at least one translation inhibiting device having a first portion thereof attached to the platform and a second portion thereof attached to the LDM mounting structure;
wherein the first and second portions of the at least one translation inhibiting device are adapted to engage each other for inhibiting the platform to translate vertically with respect to the LDM mounting structure.

13. The shock testing system of claim 12 wherein the at least one translation inhibiting device is adapted for:
allowing the platform to undergo a first instance of travel from a fully collapsed position with respect to the LDM mounting structure to a vertically extended position with respect to the LDM mounting structure and from the vertically extended position back to the fully collapsed position; and
inhibiting the platform from undergoing a second instance of travel from the fully collapsed position with respect to the LDM mounting structure after the platform returns to the fully collapsed position during the first instance of travel.

14. The shock testing system of claim 13 wherein:
the hinge bodies of a first set of the hinge assemblies are constrained to pivoting about a respective pivot axis that extends perpendicular to the vertical translation axis of the platform;
the hinge bodies of a second set of the hinge assemblies are constrained to pivoting about a respective pivot axis that extends perpendicular to the vertical translation axis of the platform; and
the pivot axis of the first set of hinge assemblies extend perpendicular to the pivot axis of the second set of hinge assemblies.

15. The shock testing system of claim 10 wherein the platform mounting structure is adapted for enabling a resonant frequency of the DSF to be selectively tuned to a plurality of different resonant frequencies.

16. A method for simulating underwater explosion testing utilizing a Floating Shock Platform (FSP), comprising:
coupling a large displacement mechanism (LDM) to an anvil of a Medium Weight Shock Machine (MWSM) through a plurality of vertical movement control structures of the LDM, wherein the vertical movement control structures jointly allow a platform of the LDM to translate vertically with respect to the anvil and inhibit translation in other directions of travel;
mounting a unit under test (UUT) on a UUT mounting structure of a deck simulation fixture (DSF) coupled to the platform of the LDM;
imparting a shock load vertically on an impingement structure of the anvil;
allowing the platform to undergo a first instance of travel from a fully collapsed position with respect to the anvil to a vertically extended position with respect to the anvil and from the vertically extended position back to the fully collapsed position; and
inhibiting the platform from undergoing a second instance of travel from the fully collapsed position with respect to the anvil after the platform returns to the fully collapsed position during the first instance of travel.

17. The method of claim 16 wherein inhibiting the platform from undergoing the second instance of travel includes latching the platform to the anvil.

18. The method of claim 16, further comprising:
tuning the DSF to a particular resonant frequency prior to imparting the shock load.

* * * * *